UNITED STATES PATENT OFFICE.

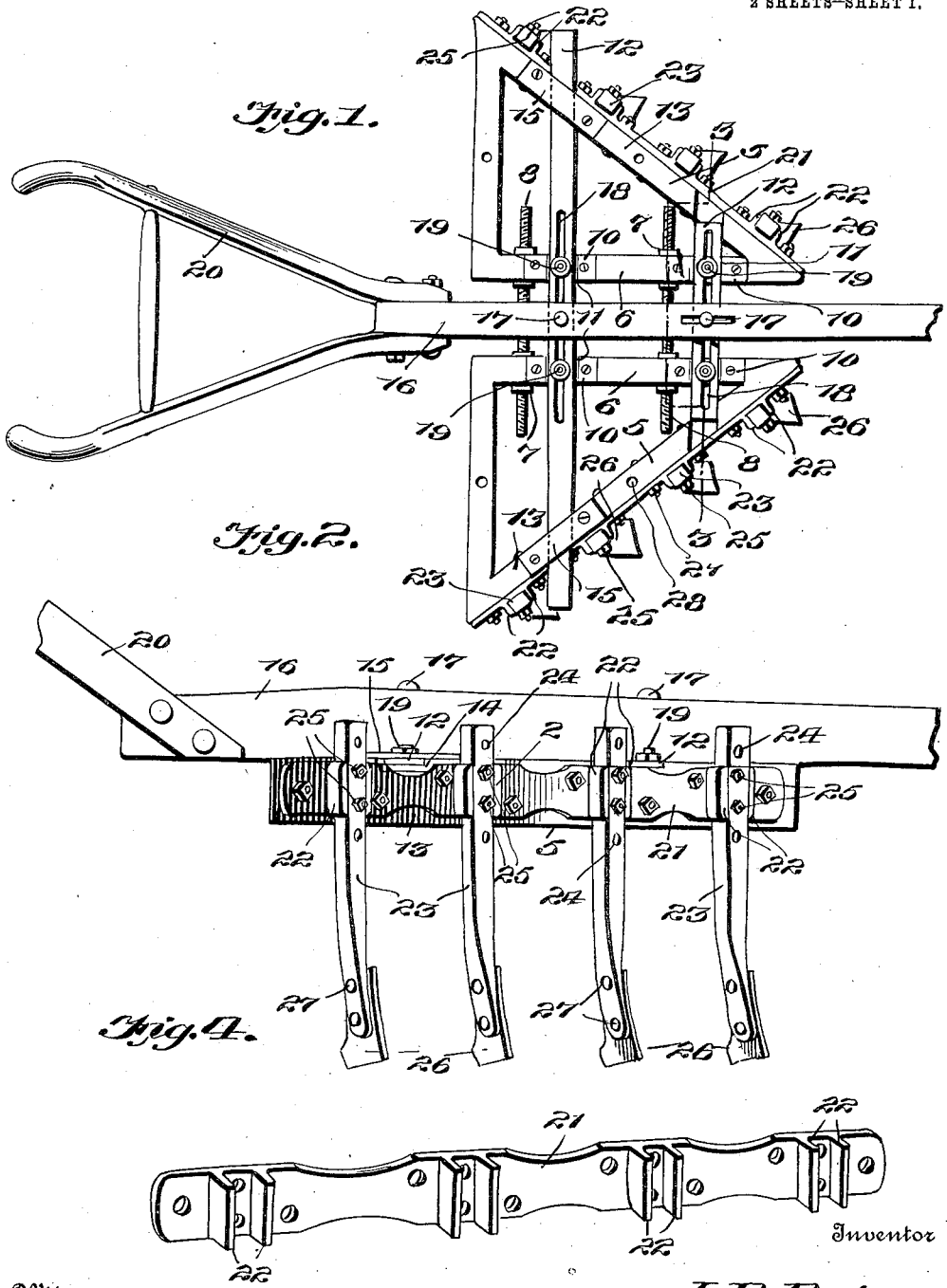

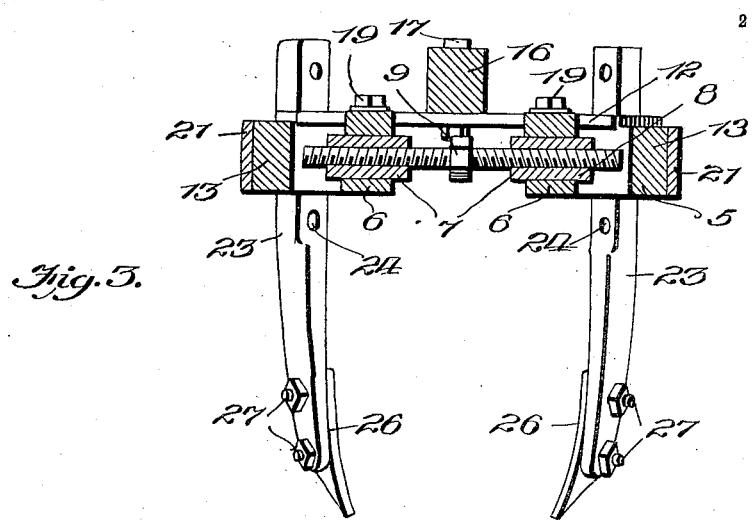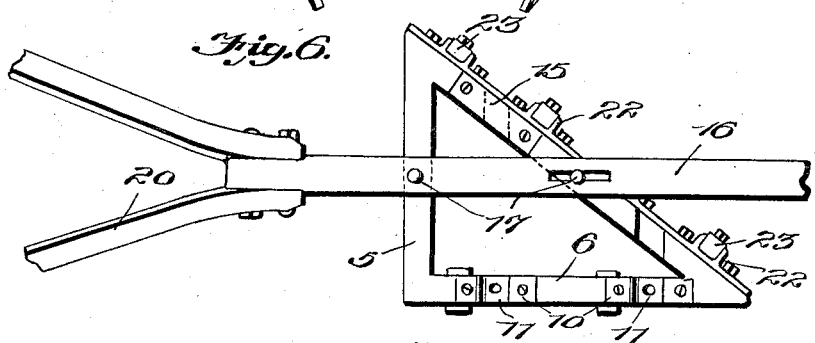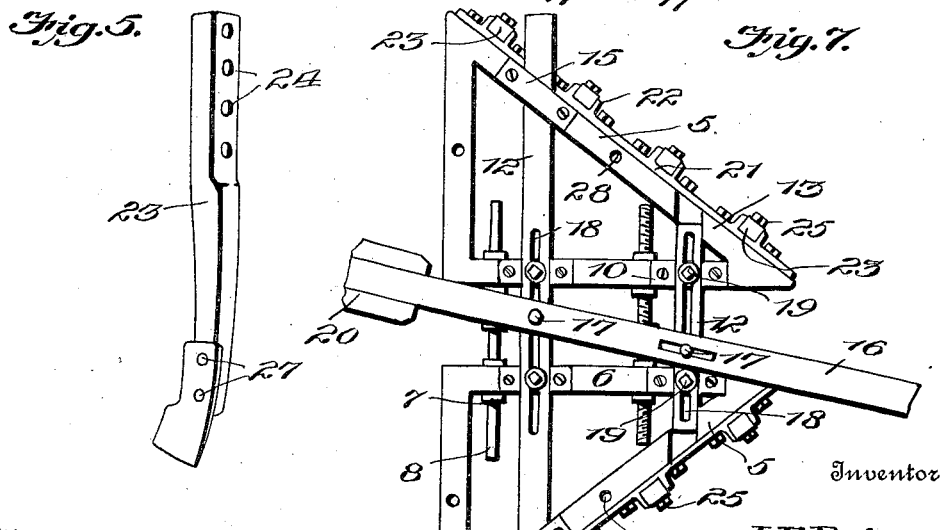

JEFF P. PATE, OF ROCKY MOUNT, NORTH CAROLINA.

CULTIVATOR.

1,091,760. Specification of Letters Patent. Patented Mar. 31, 1914.

Application filed October 19, 1912. Serial No. 726,783.

*To all whom it may concern:*

Be it known that I, JEFF P. PATE, a citizen of the United States, residing at Rocky Mount, in the county of Edgecombe and State of North Carolina, have invented certain new and useful Improvements in Cultivators, of which the following is a specification, reference being had to the accompanying drawings.

This invention relates to improvements in cultivators and has for its primary object to provide a device of this character which may be readily converted from a single into a double-row cultivator, or vice versa.

Another object of the invention is to provide a combination cultivator of the above character which will thoroughly disturb the soil at the roots of a growing crop, and may be readily adjusted to operate upon both sides of plant rows which vary in width within certain limits.

Another and more specific object of the invention resides in the provision of a pair of frames adjustable laterally toward and from each other in accordance with the width of the plant row, said frames carrying a plurality of cultivator shovels, and improved means for mounting the beam and bracing the same, said beam also being adapted for attachment to either one of the cultivator frames to adapt the same for the cultivation of both sides of a single row of plants when the same are young and have not attained a high growth.

A still further object of the invention is to provide a cultivator whereby the above purposes may be satisfactorily accomplished, said cultivator consisting of comparatively few elements of simple form whereby a device is produced which is extremely strong and substantial in practical use and may be manufactured as a whole at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a top plan view of a double-row cultivator embodying the present invention; Fig. 2 is a side elevation thereof; Fig. 3 is a section taken on the line 3—3 of Fig. 1; Fig. 4 is a perspective view of a portion of one of the plates in which the shovel-carrying standards are adjustably mounted; Fig. 5 is a similar view of one of the shovels and its standard; Fig. 6 is a plan view showing one of the harrow frames in use and the manner of mounting the beam thereon for the cultivation of a single plant row; and Fig. 7 is a similar view showing the beam disposed across the frame so that the horse walks upon one side of the plant row and the operator upon the other.

Referring in detail to the drawings, 5 designates two triangular-shaped frames which may be constructed of wood of requisite thickness, or may be formed of angle iron or other metal. The opposed longitudinally extending bars 6 of these frames are provided with internally threaded bushings or sleeves 7 which are secured in the frame bars in any preferred manner. The threads of these bushings extend in relatively opposite directions to receive the right and left-hand threads respectively provided upon opposite sides of the central portions of the adjusting rods 8. These adjusting rods are centrally provided with the polygonal-shaped nuts 9 for the application of a wrench thereto whereby the rods may be readily rotated and the cultivator frames moved toward or from each other.

The upper edges of the bars 6 of the cultivator frames are mortised at points adjacent their front and rear ends to receive the plates 10, the central portions of said plates being depressed to form seats 11 for the combined supporting and brace bars 12 which extend transversely of the cultivator frames. The inclined side bars 13 of the frames 5 are also provided with mortises adjacent their front and rear ends and in the rear mortises the plates 14 of similar form to the plates 10 are arranged to receive the outer ends of the rear bar 12 which it will be observed is considerably greater in length than the front brace bar. Strap plates 15 are arranged over the outer ends of said rear brace bar and are secured to the plates 14. The mortises at the front end of the bars 13 of the frames receive the outer ends of the forward brace bar 12.

The brace bars 12 are rigidly fixed to the under side of a longitudinal beam 16 by means of the bolts indicated at 17 and upon each side of the central bolt openings in said brace bars the same are provided with longitudinally extending slots 18 through which the vertical bolts 19 arranged in the inner longitudinal bars 6 of the cultivator frames are disposed, said bolts extending through the wear plates 10 and having nuts threaded upon their upper ends whereby the cultivator frames may be rigidly secured to the brace bars in their adjusted positions. The bolt 17 nearest the forward ends of the cultivator frames is movable in the longitudinal slot 17' provided in the beam 16 for the purpose of permitting adjustment of said beam with relation to the frames in the manner to be later explained. The beam 16 is of course provided at its rear end with the usual handles 20 whereby the cultivator may be guided by the operator as it is drawn over the ground by the draft animal.

To the outer face of each of the obliquely disposed side bars 13 of the cultivator frames, the standard supporting plates 21 are bolted or otherwise mounted. These plates are provided with spaced pairs of vertical flanges 22 to receive the upper ends of the standards 23. The upper ends of these standards are of rectangular form in cross section and are provided with a plurality of spaced bolt-receiving openings 24 to receive a pair of attaching bolts 25 which are disposed transversely through the frame bar 13 and openings provided in the plate 21 between the flanges 22 thereof. Upon the lower end of the standard 23 the earth-disturbing shovel 26 is secured by means of bolts 27 or analogous fastening elements. It will be observed from reference to Fig. 2 of the drawing, that the shovels 26 which are located at the front ends of the frames 5 and are therefore disposed closer to the stalks of the plants than the remaining shovels, are of less width than said latter shovels, so that danger of the shovels throwing large clods of earth against the comparatively weak plants and thus killing or injuring the same, is obviated. Attention is called to the fact that these shovels or earth-disturbing blades are of greater width at their lower ends than at their upper portions, said wider lower ends being curved. The shovels are made in this form so that they will cut or break up a maximum area of ground without turning the same to a great extent. Cultivator shovels as commonly used in machines of this character are usually of the same width from their lower to their upper ends and throw or turn the soil without cutting or breaking up the same so that they often leave hard stretches of unbroken soil. It is one of the objects of my particular form of these shovels, to overcome this objectionable feature.

In the use of the device, as a double-row cultivator the frames 5 are arranged upon opposite sides of the beam as shown in Fig. 1, and are adjusted by turning the rods or bolts 8 as previously explained so that the shovels will properly break up the earth or soil at the roots of the plants upon opposite sides of one row, and across the intervening space to the sides of the adjacent plant rows. When it is desired to use the cultivator upon a single plant row when the plants are young, the beam is arranged upon one of the frame sections as shown in Fig. 6, the bolts 17 mounted in said beam being disposed through openings 27 provided in the rear transverse bar and obliquely disposed side bar 13 of the frame section. The device may also be successfully used as a single horse harrow or cultivator for the cultivation of the young plants when they first appear above the ground. In such use of my invention, one or more of the rear standards is removed from each of the frame sections and the nuts 19 are loosened so that said frame sections may be adjusted toward or from each other by turning the rods 8, in order to dispose the front or small shovels carried by the frame, at the proper distance from the plant row. The beam 16 is then adjusted so as to position the same at one side of the center of the cultivator, thus permitting both the horse and the operator to walk on one side of the plant row. After the plants have attained a more mature growth, the other shovels may be added and the standards 23 properly adjusted upon the plates 21 in accordance with the height of the plants. When the beam is attached to one of the frame sections, as shown in Fig. 6, the horse and the operator walk upon one side of the plant row. By adjusting the bolts 17 in the slots of the connecting bars 12, the beam may be angularly disposed as shown in Fig. 7, so that the horse may walk upon one side of the row while the operator walks upon the other side thereof. In this adjustment of the beam 16, the forward bolt 17 moves in the slot 17' provided in the beam.

From the foregoing, it is thought that the construction and manner of use of my improved convertible cultivator will be clearly understood. As the machine comprises comparatively few elements in its construction which are of simple form, it will be obvious that the same can be manufactured at small cost. The cultivator is of great convenience in use and is highly efficient and durable in operation.

While I have shown and described the preferred form and arrangement of the various parts, it will be understood that the invention is susceptible of considerable modification without departing from the essential features or sacrificing any of the advantages thereof.

Having thus described the invention, what is claimed is:

1. In a cultivator, a beam, a pair of shovel frames arranged in spaced relation, interiorly threaded sleeves mounted in the opposed bars of said frames, adjusting rods having oppositely threaded portions engaged in the corresponding sleeves of the respective frames to adjust said frames toward or from each other, longitudinally slotted guide bars connecting said frames, and bolts carried by the beam movable in the slots of said bars.

2. In a cultivator, a beam, a pair of shovel frames arranged in spaced relation, parallel longitudinally slotted bars connecting said frames, bolts carried by the frames disposed in the slots of said bars to secure the frames in their adjusted positions, said beam being mounted upon said bars and provided with bolts adjustable in the slots thereof, whereby the beam may be disposed at a longitudinal inclination with relation to the frame.

3. In a cultivator, a beam, a plurality of bars having slots formed therein, bolts passing through the beam and slots and supporting said bars for sliding movement relative to the beam and pivotal movement upon the beam, shovel frames carried by the bars, bolts passing through the shovel frames and slots in the bars for adjustably supporting said frames, and means connecting the frames for adjusting the same.

In testimony whereof I hereunto affix my signature in the presence of two witnesses.

JEFF P. PATE.

Witnesses:
A. E. BAKER,
J. W. AYCOCK.

Copies of this patent may be obtained for five cents each, by addressing the "Commissioner of Patents, Washington, D. C."